United States Patent [19]
McLain et al.

[11] 3,963,372
[45] June 15, 1976

[54] HELICOPTER POWER PLANT CONTROL

[75] Inventors: Richard D. McLain; Robert E. Nelson; Bernard H. Van Sickle; Oran A. Watts, III, all of Indianapolis, Ind.

[73] Assignee: General Motors Corporation, Detroit, Mich.

[22] Filed: Jan. 17, 1975

[21] Appl. No.: 541,797

[52] U.S. Cl. .................................. 416/30; 60/39.15; 60/39.16 R; 60/39.28 R; 235/150.1
[51] Int. Cl.² .......................................... B64C 11/44
[58] Field of Search ............... 416/30, 27; 60/39.15, 60/39.16 R

[56] References Cited
UNITED STATES PATENTS

| | | | |
|---|---|---|---|
| 2,517,150 | 8/1950 | Webb | 416/30 |
| 2,961,052 | 11/1960 | Smith | 416/30 X |
| 3,174,284 | 3/1965 | McCarthy | 60/39.16 R |
| 3,496,562 | 2/1970 | Smith | 235/92 PE |
| 3,514,055 | 5/1970 | Gregoire | 60/39.15 X |
| 3,600,888 | 8/1971 | Nethken | 60/39.15 |
| 3,811,273 | 5/1974 | Martin | 60/39.15 |

*Primary Examiner*—Clarence R. Gordon
*Attorney, Agent, or Firm*—Paul Fitzpatrick

[57] ABSTRACT

A control system for a helicopter power plant with three power units driving the lifting rotor system. Each power unit comprises a gas-coupled gas turbine engine, a hydromechanical fuel control receiving electrical inputs to set a gas generator governor, an engine electronic control, and engine accessories.

Power plant operation is normally controlled by the pilot through condition levers and switches on a control quadrant, through a collective pitch control for the rotor blades, and through a master beeper switch which is operable to trim the setting of a rotor speed governor and the gas generator governors. A condition lever transmits a speed command signal through the electronic control of each power unit to its gas generator governor. A collective pitch signal from the rotor control system is another factor in setting the gas generator governor of each unit.

The power plant includes a power management control which equalizes the power outputs of the engines and includes the rotor isochronous governor. The power management control receives inputs of rotor system speed command and actual rotor speed, and of the torques of the individual power plants and transmits a governor trim signal to the several electronic controls.

All signals are transmitted electrically between the rotor system, control panel, power management control, and engine electronic controls. The signal representing condition lever power setting decreases with increasing power demand. The collective pitch signal decreases with increasing pitch. A failure to transmit either signal thus represents a high power request — a fail-safe feature.

A starting system for each engine includes logic circuits to test the operation of the electrical signal transmission system and closure of a fuel shutoff valve as a prerequisite to starting of the engine.

3 Claims, 9 Drawing Figures

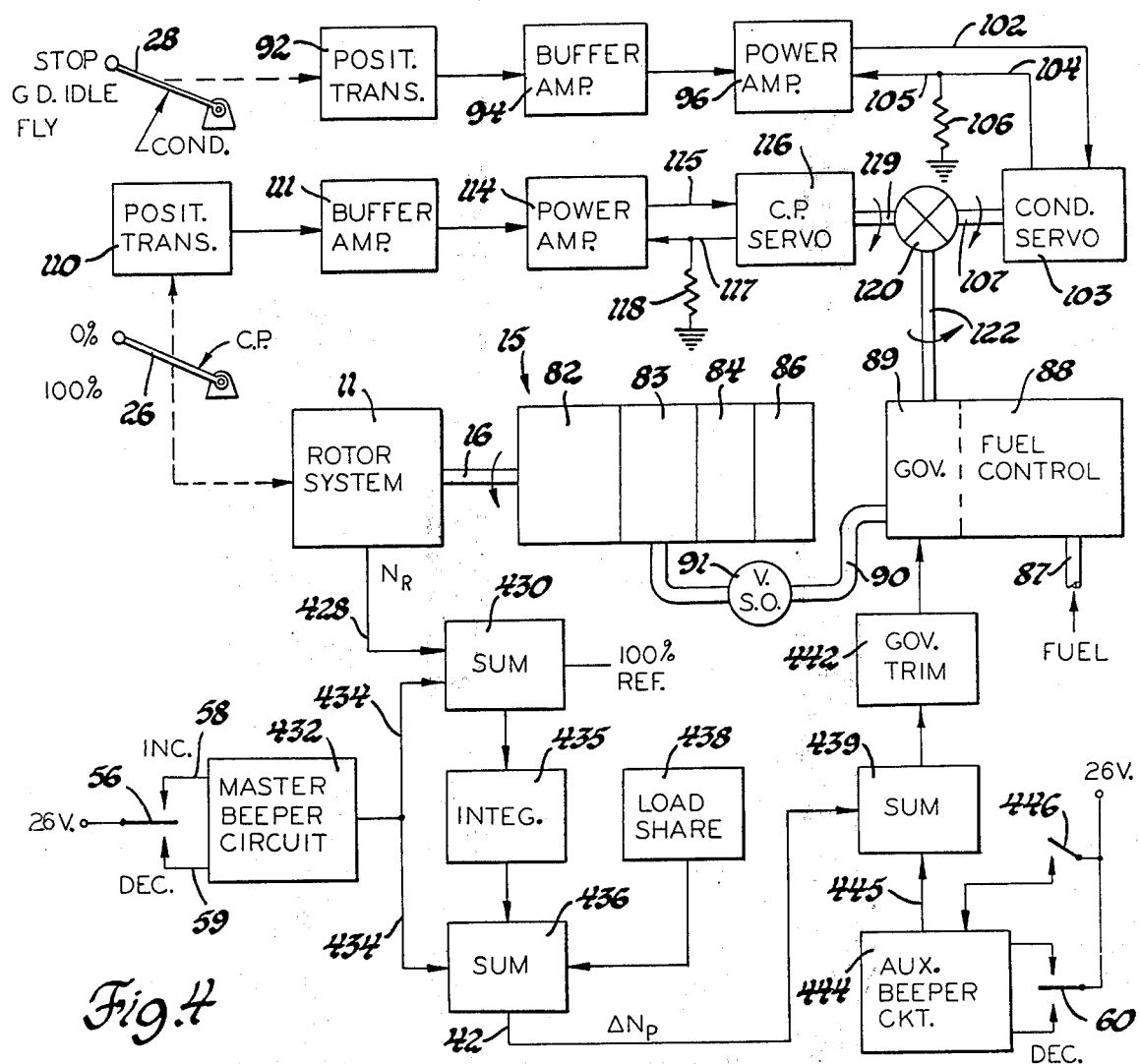
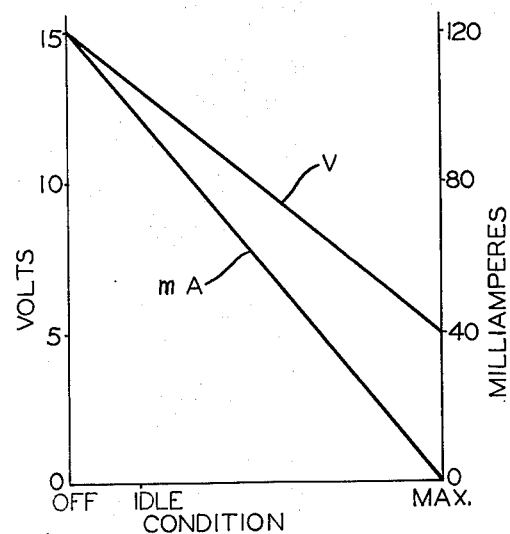
Fig. 5
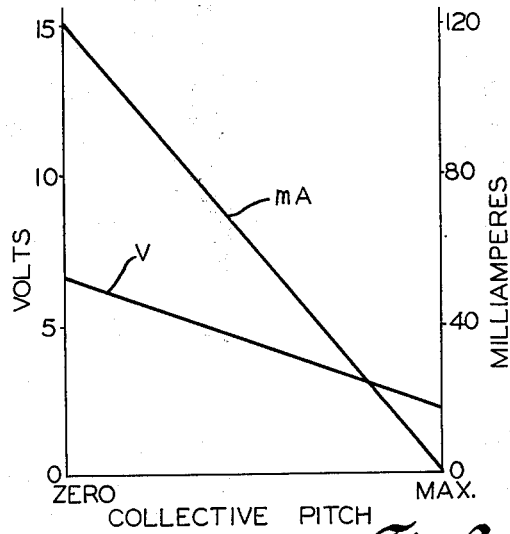
Fig. 6

HELICOPTER POWER PLANT CONTROL

INTRODUCTION

The invention described herein was made in the course of work under a contract with the Department of Defense.

This invention relates particularly to a control system for a helicopter power plant with several gas turbine engines, but may be employed in other environments. The system provides an overall control of the operation of the several engines, coordinating the engines with the lifting rotor or rotors of the aircraft and with signals transmitted by the aircraft pilot. It provides for division of the load between individual engines, for safety overrides or shutdowns in the event of casualty, for alternative modes of operation in the event of failure of some portion of the system, and particularly for electrical transmission of signals between various elements of the system at diverse points in the aircraft. Use of electrical interconnections as opposed to mechanical rigging or hydraulic controls reduces weight and increases reliability of the power plant and facilitates installation.

The principal object of the present invention is to improve controls for a multiple engine installation, particularly in helicopter installations powered by gas turbine engines; a more particular object of the invention is to provide improved controls to increase safety and flexibility of a multi-engined power plant for a helicopter.

The nature of the invention and its advantages will be clearly apparent to those skilled in the art from the succeeding detailed description of the preferred embodiment of the invention, the accompanying drawings thereof, and the appended claims.

Referring to the drawings,

FIG. 4 is a schematic diagram of portions of the system, particularly the beeper circuits.

FIG. 5 is a chart showing electrical responses to condition lever setting.

FIG. 6 is a chart showing electrical responses to collective pitch setting.

Figure 1:
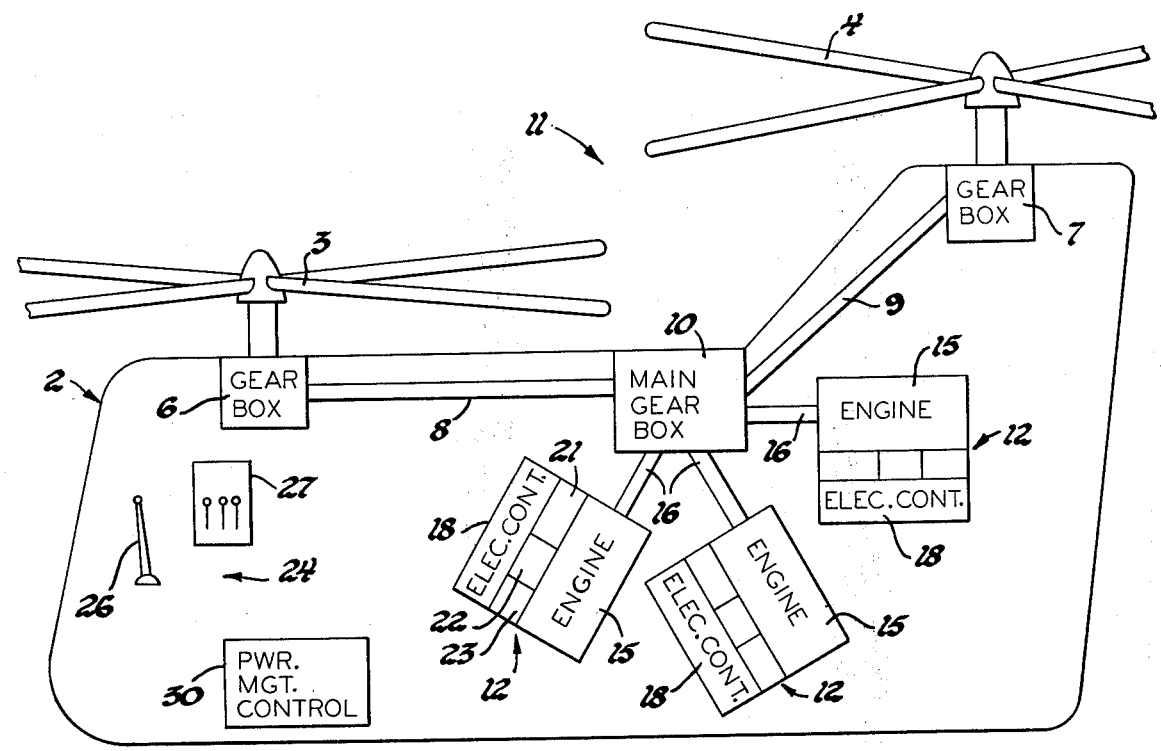
FIG. 1 is a much simplified illustration of a gas turbine powered helicopter.

Referring first to FIG. 1, this illustrates generally a helicopter installation to which the control system of the invention is applicable. This is a highly schematic diagram for orientation, and is not intended as a full description of the actual aircraft installation.

The particular installation for which this control is provided has been described more fully in a paper by J. Roger Alwang and Richard D. McLain entitled "Heavy-Lift Helicopter Engine Control System" presented at the 30th Annual National Forum of the American Helicopter Society in Washington, D.C., May 1974 (preprint No. 870). McCarthy U.S. Pat. No. 3,174,284, Mar. 22, 1965, may also be of interest as to helicopter engine controls.

FIG. 1 illustrates the aircraft so far as is necessary to an understanding of the control system of this invention. A helicopter 2 is of the type having a forward lifting rotor 3 and an aft lifting rotor 4. Rotor 3 is driven through a gearbox 6 and rotor 4 through a gearbox 7. These gearboxes are connected by shafts 8 and 9, respectively, to a main or combiner gearbox 10. The rotors, gearboxes, and shafts are termed the rotor system 11.

Power is supplied to the main gearabox by three power units 12, each of which includes a gas turbine engine 15 delivering power through a shaft 16 to the main gearbox. Each power unit includes also an engine electronic control 18 and various controls and accessories such as a fuel control 21, a compressor variable geometry actuator 22, and a starter 23. Each engine is of the gas-coupled or free turbine type. This means that it includes a gas generator comprising a compressor, combustion apparatus, and a turbine, and a power turbine energized by the discharge from the gas generator. The gas generator turbine and the power output turbine rotate independently, the latter driving the shaft 16. The shafts 16 are suitably geared together and to the rotor drive shafts 8 and 9 in the gearbox 10. An overrunning clutch (not illustrated) is provided between each shaft 16 and the common drive so that the rotor may not be braked by a casualty to an individual engine. Normally, however, the power turbines rotate synchronously as geared together through the main gearing in the box 10.

The aircraft includes a pilot's station at 24 with controls for the aircraft incuding a stick 26 by which the collective pitch settings of the lifting rotor blades are controlled, as is well known. The pilot's station also includes an engine control quadrant or control panel 27 which bears a main control lever called a condition lever for each power unit, as well as other controls and switches to be described.

The other major element of the control system is a power management control 30 which has various functions in the coordination of the operation of the power units, to be described. The electronic controls, power management control, and control quardrant are connected together only by electric wiring (not illustrated in FIG. 1), as will be further described.

The details of the rotor system are immaterial to the present invention, which is equally applicable to a single rotor helicopter, or to other power plants having control requirements comparable to that illustrated.

GENERAL DESCRIPTION

Figure 3:
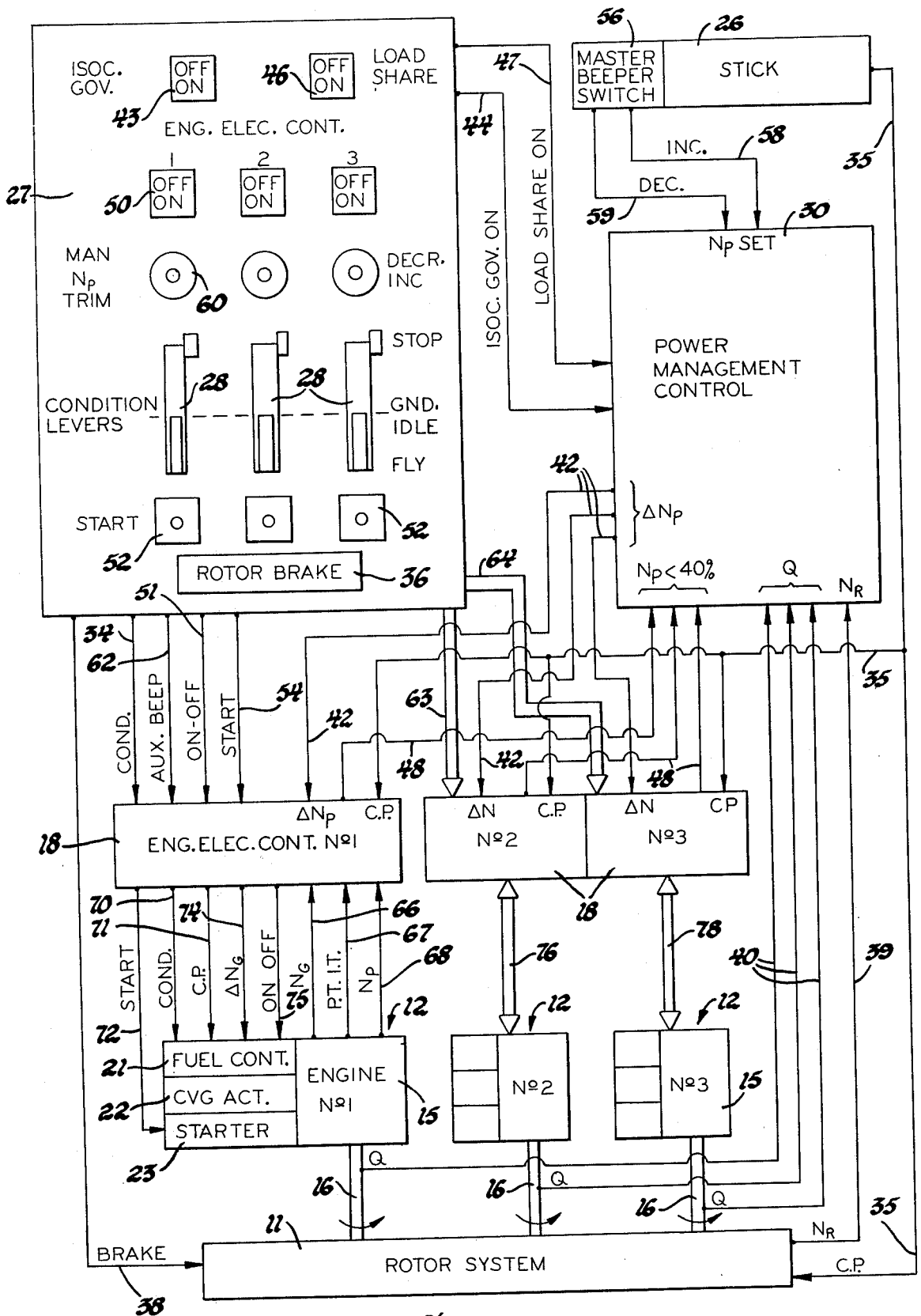
FIG. 3 is a general diagram of the overall power plant control system of the helicopter.

The nature of the interconnections between the major elements of the control system is set out in the system diagram of FIG. 3. It will be noted that the rotor system 11, power plants 12 including the component engines 15, engine electronic controls 18, fuel controls 21, compressor variable geometry actuators 22, and starters 23, are illustrated toward the bottom of the drawing. The control quadrant 27, pitch control stick 26, and power management control are illustrated in the upper part of the figure. As indicated, the control quadrant bears three condition levers 28 which are movable from a Stop position at one extreme to a Ground Idle or Start position at which the engine may be started and operated at minimum power, and further to a Fly or maximum power position at the other end of the range of movement. Engine power may be modulated between the Ground Idle and Fly positions, depending upon the movement of the lever in the quadrant.

The position of the condition lever is transmitted as an electrical signal to the engine electronic control through a line 34. An electrical signal representing collective pitch of the rotors is transmitted by a suitable transducer from the control stick 26, automatic flight control, or other source, through a line 35 to each engine electronic control; and to the rotor system 11 to set rotor collective pitch. Other transmission means to the rotor may be employed and other means of controlling rotor pitch may be employed, but the point with which the control system is concerned is that an electrical signal representing collective pitch is supplied to each engine electronic control.

The control quadrant 27 mounts a rotor brake control 36 which is connected as indicated by line 38 to the rotor drive system to hold the rotor against rotation until the brake is released. There is an interlock to prevent movement of any condition lever beyond Ground Idle until the brake is released. Line 39 represents means for transmission of a lifting rotor speed signal, specifically an alternating current the frequency of which is proportional to speed, to the power management control 30. The power management control uses the rotor speed signal as the input to isochronous governing means which establishes the final control of rotor and power turbine speed. A signal representing torque transmitted through the power output shaft of each engine is communicated to the power management control through transmission system identified as 40. These signals are converted into potentials representing the torque output of each engine in the power management control. The rotor speed and engine torque signals are used to generate a power turbine governor trim signal, indicated as $\Delta N_p$, for each engine. These are transmitted through lines 42 to the respective electronic controls 18. The rotor isochronous governor is normally on but may be turned off by a switch 43 on the control quadrant connected through a line 44 to the power management control. Likewise, the load sharing features of the power management control are normally on, but may be turned off by a switch 46 on the quandrant connected through a line 47 to the power management control. Operation of each torquemeter circuit is inhibited below 40% normal rated power turbine speed by a signal transmitted through a line 48 from each of the engine electronic controls.

Each engine electronic control 18 is turned on by its respective switch 50 on the quadrant connected through a line 51 to the control. The control quadrant also mounts a Start switch 52 for each engine connected through a line 54 to the electronic control to turn on the starter. The starter is cut out by movement of the condition lever to Stop.

The system also includes means for varying rotor speed over a limited range from its normal value by operation of a master beeper switch 56 mounted on the control stick 26. The master beeper switch includes a switch member which is movable in either direction to cause an increase or decrease in rotor speed command. The switch is connected through the lines 58 and 59 marked "increase" and "decrease" to the power management control. The signal from the beeper switch is converted to a signal compatible with those generated to balance power output between the engines, and added to these signals to contribute to the $\Delta N_P$ governor trim signals transmitted through lines 42 to the several engine electronic controls.

There is also an auxiliary beeper or manual $N_P$ trim system by which any individual engine may be trimmed slightly in governor setting under certain conditions. The auxiliary beeper system includes a switch 60 on the control quadrant for each power unit which transmits a signal through lines 62 to the electronic control.

The broad arrows 63 and 64 on FIG. 3 represent transmission of signals to the No. 2 and No. 3 engine electronic controls corresponding to those transmitted to the No. 1 electronic control.

Each engine electronic control 18 receives signals from the stick 26 or other collective pitch control, the control quadrant 27, and the power management control 30 for control of the corresponding engine. It also transmits a signal of power turbine speed below 40% to the power management control. It receives electrical signals of gas generator turbine speed, power turbine inlet temperature, and power turbine speed from the engine as indicated by arrows 66, 67, and 68. The engine electronic control transmits a current signal indicative of condition lever position over a line 70 and a current signal over line 71 indicative of collective pitch. The starter, geared to the gas generator, is energized from the electronic control through a line 72. The governor trim signal indicated by $\Delta N_G$ is transmitted through line 74 to the governor trim of the fuel control. This is a reversable current signal. On-Off electrical signals for fuel shutoff valve control are transmitted through lines 75 to the fuel control.

The fuel control, which is mounted on the engine, receives inputs of gas generator rpm, engine inlet temperature, and compressor discharge pressure directly from the engine, and is driven by the engine. The compressor variable geometry actuator regulated by the fuel control acts to vary the setting of vanes in the engine compressor.

The broad arrows 76 and 78 represent transmissions between power units Nos. 2 and 3 and their electronic controls corresponding to those indicated specifically for power unit No. 1.

It may be reiterated that all of the communications between the elements indicated by the arrows in the diagram of FIG. 3 are by electric potentials or currents and, therefore, may be transmitted by suitable wiring.

Getting now into the relation of the hydromechanical fuel controls to the engines, we refer first to FIG. 4 which illustrates any one of the gas turbines 15 as comprising in flow series a compressor 82, combustion apparatus 83, a high pressure turbine 84 indicated as T1, and a low pressure turbine 86 indicated as T2. The high pressure turbine drives the compressor and the low pressure turbine 86, otherwise called the power turbine, drives the power output shaft 16 which extends through the gas generator comprising elements 82, 83, and 84. As with gas turbine engines in general, the basic control of the engine is by control of the supply of fuel. Fuel is delivered by an engine driven pump (not illustrated) through conduit 87 to the engine fuel control 88. The fuel control includes, among other instrumentalities, a governor driven by the gas generator turbine 84 of the engine. The fuel control contains suitable provisions for determining the amount of fuel allowed to flow to the engine for steady state operation, acceleration, and deceleration, and for returning the excess to the pump inlet by conventional means (not illustrated). The fuel control 88 discharges fuel through a metered fuel line 90 in which is interposed a fuel shutoff valve 91. Valve 91 is opened when it is desired to initiate combustion during starting of the engine and remains open as long as the engine is operating.

We do not attempt here to describe the fuel control in detail, since such details are immaterial to the present invention. A great number of fuel control devices which may be used for the purposes of the present invention are known. The particular control 88 employed in practice of the present invention is manufactured by the Woodward Governor Company of Rockford, Illinois. Some insight into the structure of such engine governors may be had, if desired, from consideration of the following U.S. Pats: Plummer No. 3,426,777, Feb. 11, 1969; Barnes No. 3,442,277, May 6, 1969; and Witt No. 3,772,884, Nov. 20, 1973. As with most fuel controls for a gas-coupled gas turbine engine, this device includes a governor rotated by the gas generator turbine which controls a fuel metering valve. The basic speed setting of this governor is determined by an input which loads the speeder spring of the governor. it is also responsive to a second loading which we may call a governor trim or $\Delta N_G$ signal.

The setting of the speeder spring of the governor is effected through servo systems responsive to the settings of the condition lever 28 of the particular engine and the collective pitch lever or stick 26 which is connected to all of the fuel controls. As illustrated in FIG. 4, the condition lever 28 is connected to a position transducer 92 which transmits an electrical potential signal representing position of the condition lever to a buffer amplifier 94 which transmits a potential signal through line 95 to a power amplifier 96. The position transducer is a commercially available type device which generates a signal that is a predetermined function of the position of the condition lever. One example of such a device is a potentiometer, but more sophisticated devices such as liner-variable differential transformers are preferred. This may be coupled to the condition lever through a non-linear motion transmission linkage.

The power amplifier responds to the potential signal to generate a current which varies with condition lever position. The current is fed through a power lead 102 to a condition lever servo 103 and the current returns to ground through a line 104 and a low resistor 106. The condition lever servo is a torque motor type device which rotates an output shaft 107 proportionally to the current supplied to the motor. A potential proportional to the value of servo current is fed back to the power amplifier through a branch 105 of line 104.

The collective pitch stick 26 is connected through a position transducer 110 and buffer amplifier 111 to a power amplifier 114. The potential signal fed to power amplifier 114 causes transmission of a corresponding current signal through line 115 to a collective pitch servo 116. Current is returned to ground through line 117 and low resistor 118. The potential drop across the resistor provides a feedback of current value to the power amplifier through a branch of line 117. The collective pitch servo also is a torque motor type device which rotates its output shaft 119 as a function of collective pitch of the helicopter rotor. Rotations of the shafts 107 and 119 are added in a mechanical differential gear 120 which rotates a shaft 122 entering the fuel control 88 and coupled through suitable mechanism to the speeder spring of the gas generator turbine governor. It will thus be seen that the setting of this governor is a function of the positions of the condition lever and rotor collective pitch.

Figure 2:
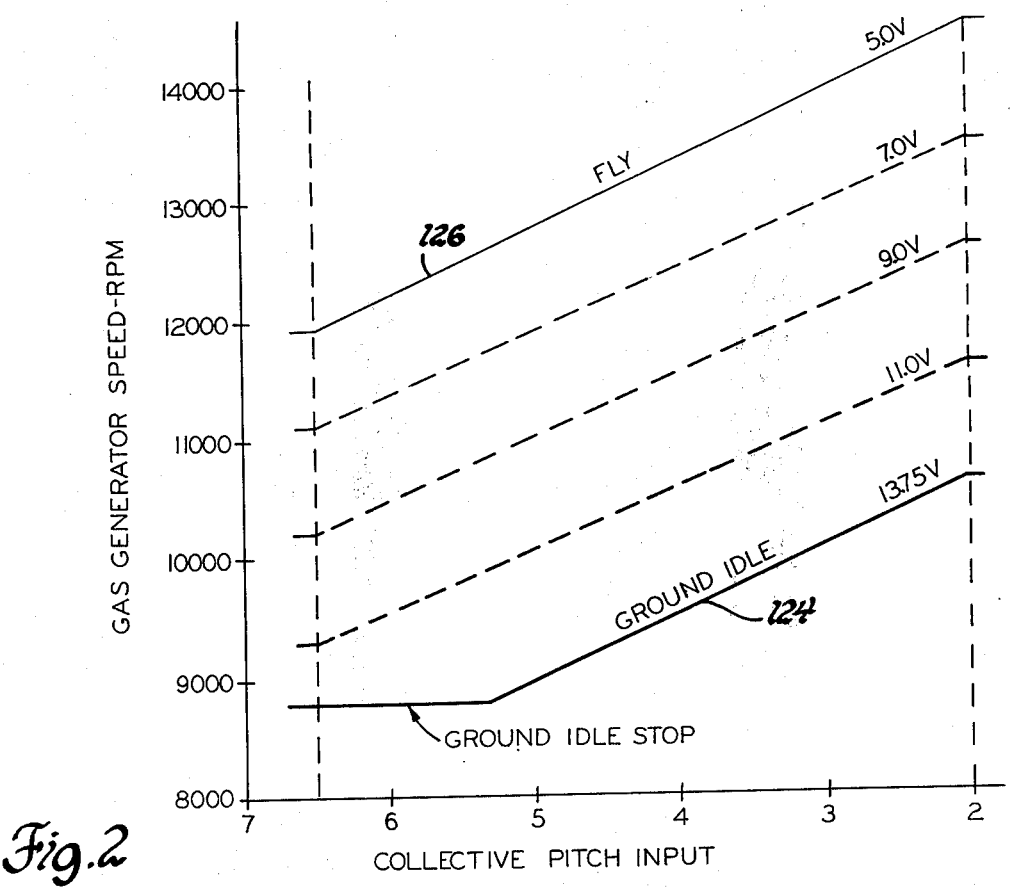
FIG. 2 is a chart ilustrating the effect on gas generator governor speed setting of condition lever and collective pitch inputs.

The effect of the collective pitch and condition inputs to the fuel control are shown in FIG. 2. This is a plot of gas generator speed as a function of collective pitch input and the condition lever input. The condition lever input is represented by a family of lines, the lowest line 124 of which is identified as "Ground Idle" and the uppermost 126 as "Fly". The collective pitch input from transducer 110 and buffer amplifier 111 varies over a range from 6½ volts for minimum pitch down to 2 volts for maximum pitch. The input from the condition lever transducer 92 and buffer amplifier 94 varies from 13.75 volts with the condition lever at ground idle position down to 5 volts with the condition lever at the miximum or Fly position. Thus, gas generator governor setting is increased as the condition lever is moved from Ground Idle toward the Fly position and as the collective pitch lever is moved from flat pitch toward miximum pitch. The input from the collective pitch lever anticipates and approximately compensates for the load added to or subtracted from the engine by changes in rotor pitch. The condition lever input normally is set to Fly; that is, to call for maximum condition lever speed input, and the speed is then trimmed by other instrumentalities. However, the condition lever may be used as a means to control the power output of the engine between Ground idle and Fly by movement of the condition lever. The minimum gas generator speed setting is approximately 8800 rpm in this particular case as determined by a fuel metering valve in response to a gas generator governor signal. Of course, the values of speed and voltage set out are merely those selected for this particular engine and aircraft installation, and might be different for other cases. It is considered highly desirable, however, to have the control potential decreased for increasing rotor pitch and for increasing power setting of the condition lever, since this results in a fail-safe condition where interruption of power in the electrical system tends to produce increased power from any engine. If not corrected in other elements of the system, as later described, the pilot may correct any error.

POWER MANAGEMENT CONTROL

Figure 7:
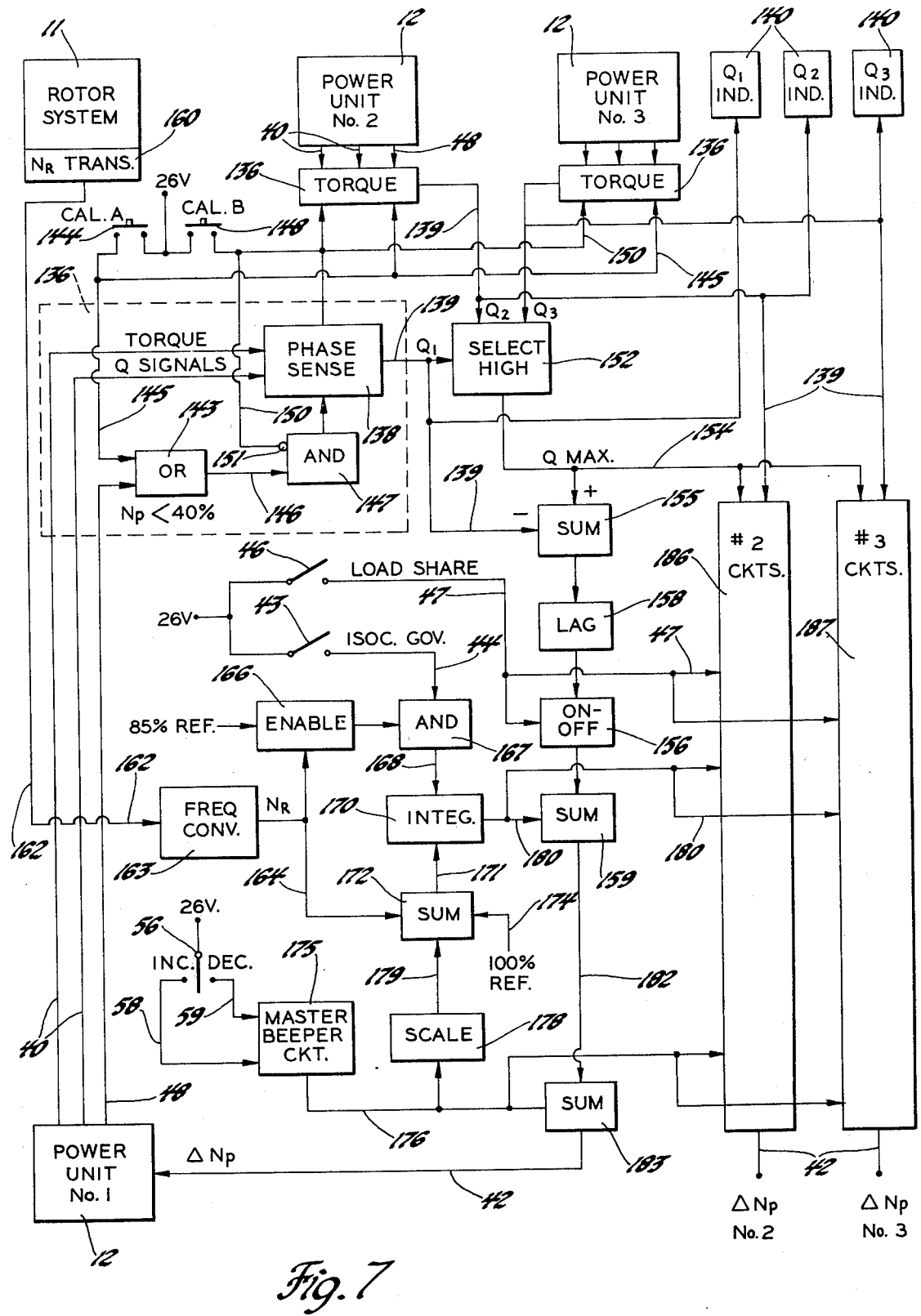
FIG. 7 is a schematic diagram of the power management control portion of the control.
Figure 8:
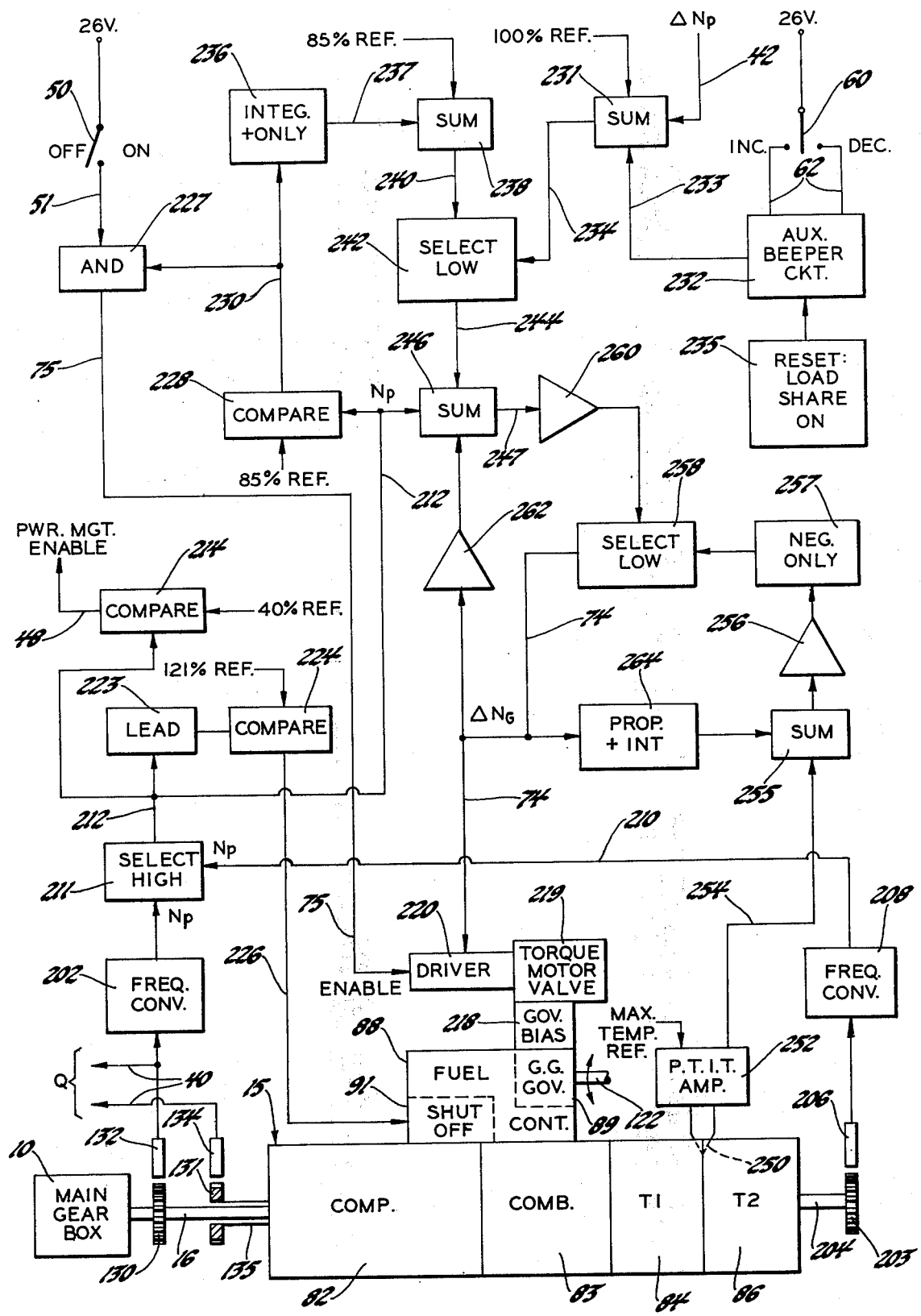
FIG. 8 is a schematic diagram of the engine electronic control for each engine.

We may now take up the power management control system which, as stated above, receives inputs of rotor speed command from the master beeper switch, rotor speed, torque of each engine, and power turbine speed below 40% from each power unit. It delivers a power turbine speed trim signal to each engine electronic control. Referring first briefly to FIG. 8 for the origin of the engine torque signals, an engine 15 is illustrated at the bottom of the figure. The power output shaft 16 from the turbine 86 enters the main gearbox 10 of the rotor system along with the output shafts of the other engines. A toothed wheel 130 is mounted on the shaft 16 which is twisted proportionally to the torque delivered by it. A similar toothed wheel 131 is mounted adjacent wheel 130 on a reference shaft 135, whch is unloaded. Inductive pickups 132 and 134 adjacent the wheels generate alternating current signals responsive to the rotation of the wheels. The value of torque is represented by the phase difference of the alternating current signals transmitted by the pickups 132 and 134. Specifically, in the particular case, the signals from the pickups are in phase at a particular negative (reverse torque) value of torque and become increasingly out of phase as torque value increases in the positive direction. The signals from these two inductive pickups are transmitted through the lines 40 (note also FIG. 3) to the torque measuring circuits 136 (FIG. 7). The principal element of each torque measuring circuit 136 is a phase sensing circuit 138 which provides a potential output on line 139 which is a linear function of torque. Specifically in the described example, the output is zero volts at minus 500 lb.-ft. torque and rises linearly to 10 volts at 5500 lb.-ft. The signal is transmitted through line 139 to elements of the power management control and aso to a pilot's torque indicator 140 for the particular engine.

There is no need to describe specific torque transducers and phase sensing circuits to explain the present invention. Tyler et al U.S. Pat. No. 2,766,617, Oct. 16, 1956, discloses structure for providing signals indicative of torque such as might be used in the present system. The preferred phase sensing circuit is irrelevant to the present invention, being the invention of another. However, one of many known phase sensing circuits may be used in this combination.

The torque measuring circuits include means for blocking their operation when power turbine speed is below 40% of full rated. passing over for the time being the means for deriving a signal indicative of power turbine speed, which is a part of the engine electronic control, the power unit transmits on a line 48 a positive signal power turbine speed of the power unit is less than 40% rated. This signal is transmitted to an OR gate 143. The other input to OR gate 143 is from a calibrating switch 144 marked "Cal. A" which connects the 26 volt supply to the gate. Thus, if either the speed is below 40% or switch 144 is closed, there will be an output on line 146 from the OR gate to an AND gate 147. The AND gate also receives an input from the 26 volt supply through a second calibrating switch 148 identified as "Cal. B". This signal is transmitted through a line 150 and an inverter 151 to the other input of AND gate 147.

When power turbine speed is below 40% rated or the calibration switch 144 is closed, the OR gate 143 provides an output on line 146 into the AND gate 147. There is also an input through inverter 151 when calibration switch 148 is not closed. In this case, the AND gate is operative to transmit a signal to the phase sensing circuit which causes the phase sensing circuit to read a very low torque value, specifically minus 254 lb.-ft., regardless of any actual torque signal. If the indicator 140 reads a different value, there is an adjustment to set this initial point of the torquemeter scale. Closing of the other calibration switch 148 transmits a signal through line 150 and inverter 151 to inhibit transmission of any signal through AND gate 147. The calibration B input is supplied through line 150 to each phase sensing circuit and should cause an artificial high reading, specifically 5281 lb.-ft A second adjustment of the phase sensing circuit is provided to change the slope of the output to match this value, so that with the two points correctly set the torquemeter output will follow the desired linear relation to torque and indicate or control accurately.

Thus, when the calibration switches are in their normally open condition and power turbine speed rises to a level over 40%, each torque circuit 136 supplies a potential on its output line 139 respesenting the torque output of the particular power turbine. These outputs are fed to a select high gate 152 which provides an output on line 154 of maximum torque, indicated as $Q_{max}$. In the particular embodiment, this is a negative signal which becomes more negative with increase in torque.

Considering now specifically the power management circuits for power unit No. 1, the maximum torque signal on line 154 and the engine No. 1 torque signal on line 139 are fed to a summing circuit 155. If engine No. 1 is the one with the highest torque, these two inputs balance out and effective output is zero. If the engine No. 1 is not that having the highest torque output, the summing circuit puts out a difference signal of the difference between engine No. 1 torque and the highest torque. This signal, which has been inverted and is positive, is supplied to an On-Off gate 156. Lag is introduced by a lag circuit 158. In practice, the lag may be introduced in the same circuit as the accomplishment of the summing. In other words, 155 and 158 may be embodied in a single operational amplifier circuit with inputs of maximum torque and engine torque through suitable resistances and a capacitive feedback from the output of the operational amplifier. The On-Off gate allows the signal calling for torque increasing correction of engine power output to proceed to a summing circuit 159 if load sharing is turned on at the switch 46 on the control quadrant 27. When this switch is closed it transmits 26 volts to the On-Off gate 156.

The summing circuit 159 adds in a speed correcting signal from an isochronous governor responsive to rotor speed.

This brings us to a discussion of the rotor isochronous governor circuit. As illustrated in FIG. 7, the rotor system 11 includes a rotor speed transducer 160, which may be a toothed wheel and magnetic pickup, which generates an alternating emf the frequency of which is directly proportional to rotor speed. This transducer may be located in the main gearbox 10. Rotor speed transducer 160 is shown as connected through a line 162 to a frequency conversion circuit 163 which provides an output potential proportional to rotor speed on an $N_R$ line 164. Circuit 163 may be of any suitable type, including that disclosed in Nelson et al. U.S. Pat. No. 3,482,396, Dec. 9, 1969. The $N_R$ signal is fed through line 164 to a gate 166 which receives a second input of emf corresponding to 85% rated rotor speed. When the $N_R$ signal is above the 85% point, gate 166 transmits a signal to an AND gate 167. The other input to the AND gate 167 is from the isochronous governor enabling switch 43 on the control quadrant. Thus, if this switch is closed to enable the isochronous governing system and the rotor speed is above 85%, the AND gate transmits an enabling signal through line 168 to an integrating circuit 170. This circuit is provided to integrate the speed error of the rotor to provide isochronous governing. In addition to the enabling input, circuit 170 receives a rotor speed error signal through line 171.

The rotor speed error signal is developed in a summing circuit 172. This circuit receives an input of actual rotor speed from line 164, an input of a reference potential representing 100% rotor speed as indicated at 174, and a further input from a master beeper circuit. This is a circuit by which the set or desired speed of the rotor may be varied over a limited range (specifically, in this preferred embodiment, from 90 to 104% of normal rated rotor speed). We will not consider the details of the beeper circuit here. It is the subject of U.S. Pat. application Ser. No. 489,262 filed July 17, 1974, of common ownership. The beeper is operated by the switch 56 (see also FIG. 3) on the pilot's control stick, which may be moved in either direction to supply 26 volt current to the increase line 58 or the decrease line 59 leading into the beeper circuit 175. If switch 56 is closed on the increase line, the beeper circuit provides a progressively increasing output on its output line 176 to the maximum which calls for a 4% increase in rotor speed setting. If switch 56 is closed on the decrease contact, the rotor speed signal on line 176 decreases progressively to a value calling for rotor speed of 90% of normal rated. This signal is transmitted through a scaling circuit 178 to the input line 179 to the summing circuit 172.

The resulting output on line 171 is the error in rotor speed which results from the difference between the actual rotor speed, the rotor speed set by the 100% reference, and the beeper circuit increment. This error signal is integrated in the integrating circuit 170 to provide the isochronous governing function, and the resulting speed correction signal feeds through an isochronous governing signal line 180 to the summing circuit 159. Therefore, assuming that load sharing and isochronous governing are both turned on, summing circuit 159 derives the correction to engine power (gas generator speed responsive to rate of fuel supply) required to equalize engine torques and provide the desired or set rotor speed. This output is transmitted through a line 182 to a further summing circuit 183.

The rotor speed signal from beeper circuit 175 is also transmitted through line 176 to the summing device 183. The final output of governor trim signal on $\Delta N_P$ line 42 thus incorporates all of the inputs which should be reflected in a change in governor setting of the gas generator to effect even load division and the desired lifting rotor speed. The correction to equalize torques, the correction from the isochronous governor to eliminate variation in the rotor speed, and the input from the beeper circuit setting the desired rotor speed are summed and transmitted to the engine electronic control. The rotor isochronous governing and beeper circuit elements are common to all power units. The circuit elements 155, 158, 156, 159, and 183 are duplicated for each power unit. These elements for power units 2 and 3 are indicated schematically on FIG. 7 by the blocks 186 and 187.

ENGINE ELECTRONIC CONTROL

FIG. 8 illustrates the basic engine electronic control configuration. We begin with a discussion of means for sensing speed of the power turbine. The engine 15 is illustrated as comprising the compressor 82 at the air inlet end, combustion apparatus 83, gas generator turbine 84, and power turbine 86. The power turbine drives the power output shaft 16 which extends through the forward end of the engine. Toothed wheel 130 and magnetic pickup 132 generate an alternating current the frequency of which is proportional to the speed of shaft 16. This signal is fed to a frequency conversion circuit 202 which provides an output potential proportional to the speed of shaft 16.

As a backup or safety device, a second power turbine speed signal is derived from a second toothed wheel 203 driven from the exhaust end portion 204 of the power turbine shaft. This wheel induces a signal in a pickup 206 which is transmitted to a frequency conversion circuit 206 which may be identical to the circuit 202 and which transmits a second output potential proportional to power turbine speed through a line 210. The details of the frequency conversion circuits 202 and 206 are immaterial to the present invention. They may, for example, be of the type disclosed in Nelson et al U.S. Pat. No. 3,482,396, Dec. 9, 1969.

Normally, the signals from the circuits 202 and 206 are equal. However, in the event of loss of one of the frequency conversion circuits, the signal from the other is employed. The two signal outputs are fed to a select high circuit 211 which transmits the higher of the two signals to a number of elements of the system through a line 212. The presence of the two speed pickups provides a safety factor apart from possible electronic failures, since the pickup 206 will respond to power turbine overspeed resulting from a broken shaft within the engine which would not be detected by the pickup 132.

One branch of power turbine speed signal line 212 is connected into a comparison circuit 214 which receives a reference emf equal to the potential generated in response to 40% rated power turbine speed, and provides a 26 volt power management enabling signal on line 48 when power turbine speed is below 40%. The disappearance of this signal from the OR gate 143 (FIG. 7) enables the torque signals from the engines to be transmitted to the load sharing system described above.

At this point, we consider briefly the fuel control 88, already described to some extent with respect to the inputs of condition and collective pitch. The fuel control, which receives fuel from a suitable pump and meters the required quantity to the combustion apparatus of the engine, includes a fuel shutoff valve 91 and a gas generator governor 89 which receives an input for setting the governor through the shaft 122 from the collective pitch and condition servos as previously described. This gas generator governor 89 is also biased in either direction to increase or decrease gas generator speed within a predetermined range by a hydraulic servo indicated as a governor bias mechanism 218. The pressure and thereby force exerted by this piston is controlled by a torque motor valve 219, a commercially obtainable device which provides a fluid pressure which is a direct function of the current supplied to the torque motor valve 219. The current is supplied by a valve driver circuit 220 which responds to a potential signal indicating the desired increment or decrement of gas generator speed through the line 74 (see also FIG. 3).

The shutoff valve 91 is energized to shut off fuel to the engine whenever the speed and acceleration of the power turbine are such as to indicate incipient runaway conditions. Cutting off fuel deenergizes the power turbine to prevent runaway. The circuit for this runs from the $N_P$ power turbine speed line 212 through a lead circuit 223 which adds an acceleration component to the speed signal so that the output from the lead circuit is proportional to power turbine speed, plus a constant times acceleration of the power turbine which speeds up the valve closing action in case of rapid acceleration such as might occur with a broken power turbine shaft.

The overspeed signal from the lead circuit 223 is fed to a comparison circuit 224 where it is compared with a reference signal, which in this case preferably represents 121% rated power turbine speed. If the signal transmitted from circuit 223 is greater than the voltage corresponding to 121% speed, the circuit 224 energizes a line 226 which causes a solenoid mechanism to close valve 91.

The governing features of the engine electronic control are turned on and off by a switch 50 on the control quadrant which supplies 26 volt power to the engine electronic control through a line 51. This signal is supplied to an enabling circuit for the valve driver amplifier 220 through an AND gate 227 and line 75. This signal is transmitted only if the AND gate is also energized by a signal indicating power turbine speed above 85%. This assures that there is no governor trim until power turbine and lifting rotor speeds reach 85%. The enabling signal is derived from the power turbine speed signal in line 212 by a comparison circuit 228 which receives also a reference voltage input corresponding to the 85% $N_p$ signal. The output of this comparison circuit is fed through line 230 to the AND gate 227. Unless switch 50 is closed and power turbine speed is above 85%, the governor trim is inoperative, because the driver circuits are not able to operate in response to the signal in line 74.

Proceeding to the origin of the gas generator governor trim signal, this may respond to a number of inputs; specifically, power turbine speed, the power turbine speed trim signal in line 42 from the power management control 30, a signal from a power turbine speed trim or auxiliary beeper circuit on the control quadrant, and a power turbine inlet temperature limit circuit. The generation of the power turbine trim signal in the power management control has been described above. This is fed through a line 42 for each engine into a summing circuit 231 which also receives an input potential representing 100% rated power turbine speed.

There is a further input from an auxiliary beeper circuit which is operable only when load sharing is turned off. For description of the system disclosed here, it is sufficient to point out that the Manual Trim Switch 60 on the control quadrant (FIG. 3) is operable to energize lines 62 leading to the auxiliary beeper circuit 232. When the increase line is energized the auxiliary beeper circuit provides a progressively increasing signal on its output line 233, and when the switch is closed on the decrease line, this signal is decreased. The power management trim signal or the auxiliary beeper trim signal is added in circuit 231 to the 100% reference signal to provide a component of the governor trim signal. This is fed through line 234 to a select low circuit 242. When load sharing is turned on, the auxiliary beeper is reset to zero by an input from reset 235.

A feature of the control is that, when the governor does become effective at 85% power turbine speed, it controls so as to provide a desired limit to rate of increase of power turbine speed so that there is no sudden surge of power into the rotor system as the governing system becomes effective. The enabling signal from the comparison circuit 228 is fed above 85% power turbine speed through line 230 to an integrating circuit 236 which provides a gradually increasing signal, starting at zero when it is energized. This signal, which varies progressively from zero to substantially greater than the signal corresponding to 15% gas generator power turbine speed, is fed through a ramp signal line 237 to a summing circuit 238. Here the gradually increasing signal from integrator 236 is added to a potential corresponding to 85% power turbine speed. The result is a power turbine speed command signal on a line 240.

This signal starts at the value for 85% power turbine speed when the control is made operative and increases, preferably at a rate of about 3% rated gas turbine speed per second, to a value which is appreciably in excess of that for 100% power turbine speed. This signal is supplied to a select low gate 242. The other input to this gate is the power turbine speed control signal supplied by the summing network 231 through the line 234. The lower signal is selected and fed through line 244 to a summing circuit 246. By virtue of the action of the select low circuit, the increasing acceleration control signal on line 240 is effective only up to the point of equality with the normal control signal supplied over line 234. As the signal on line 240 increases beyond the value called for in line 243, which has a maximum of 104% rated, the signal on line 240 becomes ineffective after serving its purpose of controlling acceleration during initial speedup of the rotor system.

The summing circuit 246 receives also an input of actual power turbine speed from line 212, and an input of a gas generator governor trim signal, to be described. Leaving that aside for the moment, summing circuit 246 finds the difference between the power turbine output demand and actual power turbine output, and produces a corresponding signal on speed error line 247.

This signal is ultimately applied through the valve driver 220 to torque motor valve 219 to correct gas generator speed and thus engine power output. However, it is subject to override by an engine overtemperature signal. The engine is protected against overtemperature by a response to power turbine inlet temperature generated by thermocouples 250 in the engine. The potential generated by these thermocouples is proportional to temperature. This potential is amplified in a power turbine inlet temperature amplifier 252 which includes a temperature reference signal generating means to provide an emf representing the maximum allowable temperature. The amplifier 252 delivers a turbine temperature signal on line 254. This signal is negative in the normal temperature range and increases with temperature. At the established temperature limit the signal becomes positive and is increasingly positive as the overtemperature increases. This signal is summed with a feedback signal to be described in a summing circuit 255. The resulting signal is amplified and inverted in a high gain amplifier 256 which delivers a signal which is normally highly positive but becomes highly negative during overtemperature. This signal is fed through a "Negative Only" gate 257, which passes only negative signals, to one of the inputs of a select low gate 258.

The other input of gate 258 is a speed responsive signal which is generated by a high gain amplifier 260 energized by the signal in line 247 from the summing device 246. Amplifier 260 provides a positive input to the gate 258 except when the signal on line 247 indicates greater than requested speed, in which case the signal becomes highly negative. Thus, if there is either an over-limit temperature or power turbine outout greater than that called for, a negative signal is transmitted from the select low gate 258 to the valve driver amplifier through line 74. If temperature is below the established maximum and speed is below that called for by the signals added in summer 246, a positive signal is transmitted through line 74. A positive signal causes the driver to operate the torque motor valve to increase fuel, and a negative signal operates the driver to cause the valve to decrease fuel. As previously stated, this is effected by exerting a force on the governor-operated valve in the fuel control, effectively trimming the gas generator governor speed setting.

The valve driver signal on line 74 is fed back to the speed and temperature circuits. A proportional feedback of this signal is developed by an amplifier 262 which provides a damping input to the summing device 246. If the engine is under the selected speed and the summing device is ordering to the valve driver to increase fuel, thus the amplifier 262 provides a small negative input to the summing device to damp the input to the valve driver and prevent over-reaction and overtravel of the torque motor valve. There is also feedback to the summing device 255 which, in this case, includes an integrating term so that there is a lag in the feedback to the amplifier 256. This signal is generated in an integrating amplifier 264 which provides dynamic compensation for suitable transient performance.

START-STOP CONTROLS AND LOGIC

Figure 9:
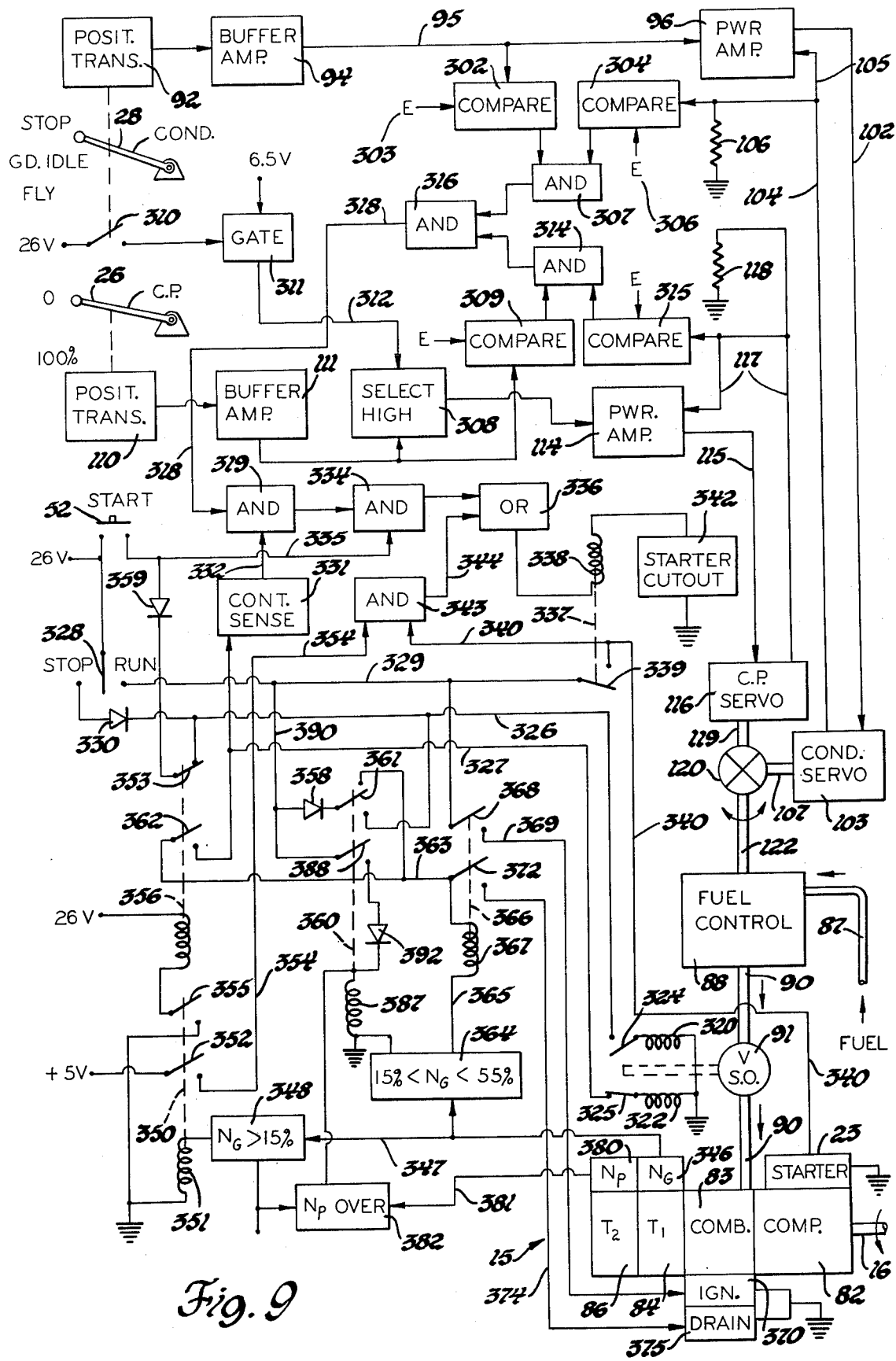
FIG. 9 is a schematic diagram particularly directed to the start-stop safety controls.

The control system includes various interlocks to assure proper conditions in the controls prior to starting each engine and to provide proper sequencing of events during starting of each engine. It also includes emergency stopping means responsive to overspeed. We may now refer to these, with particular reference to FIGS. 5, 6, and 9.

First, with respect to the transmission of control signals to the condition servo and to the collective pitch servo, specifically the preferred values of constants: The position transducer 92 and buffer amplifier 94 deliver a signal which equals 15 volts minus 0.1 volt for each percent of lever movement, thus covering a range from 15 volts at zero movement down to 5 volts at 100%. The signal from the position transducer on the control quadrant is transmitted to the engine electronic control which includes the buffer amplifier and power amplifier to drive the condition lever servo of the particular power unit. The power amplifier 96 generates a current which is a linear function of the input potential; specifically, in the described example, this varies from 120 milliamps for zero condition lever position to zero mA for 100%. This is a fail-safe feature since, if the power amplifier transmits no current or the leads to the condition servo break, for example, the condition lever servo remains in the 100% or full power position. The current return from the condition servo is grounded through a 20 ohm resistor 106 so that a potential is fed back to the power amplifier varying linearly from zero at zero mA to 2.4 volts at 120 mA. It constitutes a feedback to the power amplifier which regulates the current to balance this feedback against the input potential from line 95, as will be readily understood.

To check the operation of the condition lever servo circuits, the potential signal on line 95 is fed to a comparison circuit 302 which also receives an emf from a controlled source 303 of 13.3 volts representing 17% power lever position. The feedback potential from resistor 106 is supplied to a comparison circuit 304 which also receives an emf from a source 306 of 2 volts corresponding to the 17% position (100 mA servo current). If the signals transmitted are not less than the reference signals indicated by 303 and 306, the comparison circuits transmit positive signals to an AND gate 307. Signals not less than the reference indicates that the condition lever and servo are not beyond the 17% in range of movement from OFF. The AND gate determines that the check conditions for operation of the condition servo circuit have been met.

There is a similar circuit, with some additions, for transmission of the signal from the collective pitch lever to the collective pitch servo. In this case, the position transducer 110 controls a buffer amplifier 111 (one for each power unit) which transmits a signal of 6.5 volts minus 0.045 volts per percent of lever movement from zero rotor pitch to a select high gate 308 and a comparison circuit 309. An additional signal to gate 308 originates in a condition lever switch 310 which is closed only when the condition lever is a ground idle or lower and is opened when the condition lever is moved past ground idle to call for additional power from the engine. The resulting 26 volt signal is the enabling signal for a gate 311 which has an input of a controlled potential 6.5 volt signal. When switch 310 is closed, it enables transmission of the 6.5 volt signal through a line 312 to the select high gate 308. This 6.5 volt signal is the signal for zero rotor collective pitch. Thus, if the collective pitch lever has mistakenly been advanced beyond zero pitch position, the signal on line 312 will override that sent by the buffer amplifier 111 to the select high gate 308. When the condition lever is moved beyond the ground idle position, this signal in line 312 is turned off and the signal from the collective pitch lever is in control of the selective pitch servo.

Checking logic for the collective pitch circuits are as follows: The comparison circuit 309 compares the collective pitch signal from buffer amplifier 111 with a control input of 2 volts and provides an output to an AND gate 314 unless the buffer amplifier output is less than 2 volts. The fourth comparison circuit 315 receives a potential feedback through a branch of line 117 proportional to collective pitch servo current and a controlled reference potential of 2.4 volts. This circuit provides an output to AND gate 314 if the collective angle servo current is not less than 120 milliamperes, which is the current value corresponding to zero rotor pitch. Thus, if the potential transmitted by the buffer amplifiers to the power amplifiers check out and if the currents supplied by the power amplifiers to the servos 103 and 116 check out, the two AND gates 307 and 314 will be satisfied and both will transmit positive signals to a third AND gate 316. AND gate 316 under these conditions delivers a positive signal to a line 318 which may be termed a No Start Fault signal. It indicates that the condition and collective servo circuits are operating properly. This signal is communicated to another AND gate 319.

AND gate 319 is a part of logic to prevent initiation of the starting cycle unless the fuel shutoff valve 91 is closed. This valve must open to start the engine, but until the engine is at an appropriate speed, it must remain closed. This valve is closed in proper operation of the system when the engine is shut down. However, it could be opened as a result of some interference by engine repair workers during shut down of the engine. This means its proper closure should be checked.

To explain this, a brief description of the valve is required. Valve 91 has only two operating positions, fully open and fully closed. To close the valve, a solenoid coil 320 is energized; to open the valve, a coil 322 is energized. These solenoid coils effect the physical movement of the valve from open to closed position and from closed to open position, respectively. The mechanism also includes limit or cutout switches, a switch 324 in series with coil 320 and a switch 325 in series with coil 322. When the valve is open, switch 324 is closed to complete a circuit to the closing coil 320. When the valve is closed, switch 325 is closed and switch 324 is open. This opens the circuit to the closing coil and makes the circuit to the opening coil 322. These coils are connected to ground and are connected through the switches to a valve closing coil energizing line 326 and a valve opening coil energizing line 327.

The valve closing line 326 has two sources of energization; one is a stop-run switch 328 supplied from the 26 volt power supply which closes on a Stop contact when the corresponding condition lever is moved to Stop. It is closed on a Run contact whenever the condition lever is moved away from the Stop position. Thus, with the condition lever in the Stop position, the circuit is closed from the 26 volt supply through switch 328 and a diode 330 to the valve closing line 326. This assures shutdown of the engine by shutting off the fuel upon movement of the condition lever to Stop. Line 326 is also energized upon overspeed of the engine, as will be explained.

Before starting of the engine is initiated, the condition lever is at Stop and, therefore, the valve closing line 326 is energized. If the valve is already closed, the switch 324 is open, but if the valve is open, switch 324 is closed and the coil is energized to close the valve. When the valve is closed, the switch 324 opens and switch 322 closes to connect line 327 to ground through coil 322. This closed condition is checked by a continuity sensing circuit 331. This circuit includes a resistor fed from a source of potential and means for sensing the potential downstream of the resistor. If the shutoff valve 91 is closed and, therefore, switch 325 is closed, a low potential is sensed because of the voltage drop through the resistor connected in series with the coil 322 to ground. This sensing current, of course, is far below that necessary to operate the valve. If the switch 325 is open, indicating that the valve is open, a high potential is sensed (no drop in the resistor) and the continuity sensing circuit discriminates. Thus, if the valve 91 is closed, the continuity sensing circuit provides a plus input to the AND gate 319. A plus output from this gate therefore signifies that there is a No Start Fault signal on line 318 and a fuel shutoff valve closed signal on line 332.

The result is transmitted to a still further AND gate 334. The other positive input of this AND gate is provided when the Start switch 52 on the control quadrant for a particular power unit is closed. Closing this switch puts 26 volts through line 335 to the other input of AND gate 334. The output of the AND gate is communicated to an OR gate 336 which controls energization of coil 338 of a starter relay 337. At the time starting is initiated, the other input of the OR gate is off; it is a holding circuit which becomes effective only after gas generator speed reaches 15%. Therefore, the starter relay 337 may be energized only if all of the conditions determined by the comparison circuits 302, 304, 309, and 315 are correct, the fuel shutoff valve is closed, and the Start switch 52 is closed. With these conditions satisfied, coil 338 is energized to cause the starter to operate. This alone is not sufficient to initiate a starting cycle of the engine; but is sufficient to motor the engine with the starter.

Specific means for energizing the starter are immaterial. Ordinarily, the starter is an air-operated motor and it requires opening of an air valve to energize the starter. As indicated schematically here, the starter is energized by the circuit from 26 volts through condition lever switch 328 in the Run position, front contact 339 of the starter relay, and energizing line 340 to the starter 23. The circuit through the coil 338 is completed through a starter cutout 342 to ground. The nature of this device is immaterial. It will be sufficient to state that it serves to terminate energization of the starter upon completion of the starting cycle or upon failure to start by breaking the circuit through relay coil 338 and allowing contact 339 to open.

The Start switch 52 must be held closed until the gas generator reaches 15% speed, after which the starting cycle may only be interrupted by operation of the starter cutout or by return of the condition lever to the Stop position. The energizing line 340 to the starter or starter air valve also provides one of the inputs to an AND gate 343. The output of the AND gate through line 344 is the other input to starter energizing OR gate 336. The other input to AND gate 343 is energized at 15% gas generator speed.

The engine includes a gas generator speed transducer or transmitter 346 which could be any suitable tachometer generator driven by the gas generator. Preferably, a toothed wheel and pickup generate an emf of frequency proportional to gas generator speed. A conversion circuit derives from this a DC emf proportional to speed. This is supplied to cockpit indicators (not illustrated) and to discriminating circuits for control of the starting sequence. The DC signal is transmitted through a line 347 to a gate or discriminator 348 which connects the 26 volt power supply through coil 351 of a relay 350 to ground. Energization of the relay in response to gas generator speed above 15% connects a plus 5 volt input through front contact 352 of the relay and line 354 to the AND gate 343. Thus, with the starter energized and gas generator speed reaching 15%, the second input to the OR gate 336 is present. The input through Start switch 52 may be discontinued, and the starter will continue to operate.

When gas generator speed reaches 15%, a relay 350 also closes its contacts 355 to energize a relay 356, the circuit being from 26 volt power supply through coil 357 of the relay and contact 355 to ground. This completes a circuit from the Run power line 329 through a diode 358 and back contacts 361 of a power turbine overspeed relay 360 to energize the fuel shutoff valve opening circuit. Relay 360 is deenergized except when power turbine speed is excessive, so there will be a circuit from line 329 through diode 358, back contacts 361, line 363, and front contacts 362 of relay 356 to line 327, through closed switch 325 and coil 322 to open the fuel valve. When the valve opens, this circuit is broken at switch 325. Relay 356 also opens the circuit from "Start" line 335 through diode 359 and its back contacts 353 to the valve closing line 326.

Now, the ignition is turned on and the fuel drain valve is closed by a gate or discriminating circuit 364 which receives the gas generator speed signal and closes a circuit to coil 367 of a relay 366 when gas generator speed is in the range from 15 to 55% of rated. Circuit 364 grounds a line 365, thus completing a circuit from Run line 329 through diode 358, contacts 361, line 363 coil 367, and line 365 to ground. Energizing relay 366 closes front contacts 368, completing a circuit from the Run line 329 through a line 369 and a fuel igniter 370 to ground. Any other suitable arrangement may be used to energize the igniter through the 15 to 55% gas generator speed range.

Also, during this range of gas generator speed, front contacts 372 of relay 366 complete a circuit from line 363 to a line 374 which energizes the fuel drain valve solenoid 375. This fuel drain valve is a conventional element of gas turbine engines. It may be held closed either by an electric current or by fuel pressure in the combustion apparatus. When the engine is started, it is open to allow any fuel remaining in the combustion apparatus to drain. It is closed at 15% speed as just described. When the gas generator has reached 55% speed, the pressure will hold the drain valve closed until the engine is shut down and has come nearly to a stop. At 55% speed, the ignition and the drain valve solenoid are deenergized by operation of gate 364 to interrupt the circuit through relay coil 367. At this point the engine may be in self-sustaining operation, and at some point in the cycle the starter is cut out, allowing the engine to continue to accelerate under its own power.

This completes the starting cycle of the engine, and it should run until shut down. The engine may be shut down by moving the condition lever to Stop, which not only reduces fuel but energizes line 326 to close the fuel shutoff valve 91. The fuel control may also include a shutoff valve operated mechanically by operation of the condition lever input to the control, but this is immaterial.

The operation of the control to stop the engine in case of overspeed depends upon a power turbine overspeed discriminating circuit. A power turbine speed transducer 380 transmits a speed signal through line 381 to an overspeed detection circuit 382. The details of this circuit are immaterial here. Various circuits for the purpose are known. When imminent or existing overspeed is sensed by comparison circuit 382, it connects the 26 volt power supply through coil 387 of overspeed relay 360 to ground. The relay thus closes its front contacts 361 to complete the circuit from the Run line 329 through diode 358 to the fuel valve closing line 326. It also closes front contacts 388 to complete a holding circuit for the relay coil from the Run line 329 through branch line 390, contacts 388, a diode 392, and coil 287 to ground. The overspeed relay thus remains energized until the circuit is deenergized by returning the condition lever to Stop to open the Run circuit at switch 328.

GOVERNOR TRIM SYSTEM

As indicated above, there is a master beeper circuit by which the speed setting of the lifting rotor governor may be varied over a certain range from the nominal rated speed. There is also an auxiliary beeper circuit for each engine which makes it possible to vary the setting of the gas generator governor of that engine either positively or negatively to a limited extent.

Referring to FIG. 4, a potential signal representing lifting rotor speed and therefore power turbine speed is supplied from a tachometer circuit responsive to rotor speed through a line 428 to a summing circuit 430. This summing circuit receives a 100% rated rotor speed reference signal and also receives a rotor speed trim signal from the master beeper circuit 432 through a rotor speed trim signal line 434. The rotor speed trim signal progressively increases or decreases as switch 56 is operated to energize line 58 or line 59. The sum of the 100% reference and the speed trim signal is the desired or command value of rotor speed and the signal on line 428 the actual value. The summing circuit delivers a rotor speed error signal to an integrating circuit 435 which integrates speed error with respect to time. The output of the integrator is fed to a summing circuit 436. This also receives the output of the master beeper circuit in line 434 to provide immediate response to rotor speed change command without error integrating circuit delay. The summing circuit 436 also may receive a potential signal for resetting the engine governor to equalize torques of the several engines from a load sharing circuit 438. This circuit receives inputs of actual torque outputs of all engines, determines the highest torque, and determines the torque deficiency of each engine (zero for the highest torque engine). This signal is added to the beeper circuit signal and the integrated rotor speed error circuit to provide a $\Delta N_P$ or power turbine governor trim signal in line 42 to a summing circuit 439. This summing circuit is provided to add the auxiliary beeper signal. Assuming for the present that the auxiliary beeper signal is zero, the summing circuit 439 transmits a governor trim or $\Delta N_G$ signal to the governor trimming means 442. The governor trimming means includes servomechanisms which apply a fluid pressure to the governor which adds to or subtracts from the force of the governor speeder spring so that it effectively changes the setting of the engine governor and thus gas generator speed of the engine. The trim means can adjust governor setting by about 15% of nominal maximum gas generator speed in either direction.

As indicated schematically, the governor trimming means provides an input to the governor 89 in fuel control 88 which correspondingly changes fuel flow to the engine to bring gas generator speed to a value based upon the input through shaft 122 plus or minus the bias imparted by the governor trimming means. This trimming of gas generator speed correspondingly affects the torque of the power turbine and thus the division of load between the engines. It also reflects any necessary change in overall power output by trimming all governors concurrently to maintain the desired rotor speed.

It should be understood that the master beeper circuit, summing device 430, and integrator 435 are elements of the entire power plant. The torque correction circuit provides an individual signal to each engine. The summing circuit 436 and elements downstream are individual to a particular engine.

If the load sharing system represented by element 438 is cut out, the governor of any engine may have its speed varied to a limited extent by an auxiliary beeper circuit 444 for that particular engine. As illustrated, the auxiliary beeper circuit responds to increase or decrease signals from the auxiliary beeper switch 60 for that engine on the control quadrant 27. When the switch 60 is moved to Increase, the potential delivered by the beeper circuit progressively decreases and, when it is set to Decrease, the potential progressively increases. The auxiliary beeper circuit is reset to zero output and held there by a 26 volt input through a switch 446 which is closed when the load sharing system is effective. The torque correcting system and the auxiliary beeper system would conflict if simultaneously effective. The auxiliary beeper input added in summing circuit 439 to the $\Delta N_P$ input provides the gas generator trim or $\Delta N_G$ signal sent to the governor trimming means 442.

It will be clear from the foregoing, therefore, that the master beeper circuit provides a potential signal which is added to other controlling signals in the system to change total power output as required to obtain the desired rotor speed. The auxiliary beeper circuit is operable to reset to a limited extent the governor of the corresponding engine by generating a potential indicative of desired change which is routed through the engine control system to the governor trimming means.

OPERATION

While the operation of the power plant control system may well be clear to those skilled in the art from the foregoing detailed description, it seems best to discuss the operation and, in connection with this, to point out some of the characteristics of the control system more fully.

We may begin with the starting procedure, in which each engine is started independently. The isochronous governor, load share, and engine electronic controls may be energized through the switches on the control quadrant 27. The rotor brake is applied by the control 36 on the control quadrant. To start the engine, the corresponding condition lever is moved to Ground Idle (or to a Start position below Ground Idle if desired, but not above Ground Idle). The collective pitch control should be set to zero or flat pitch. If it is not, an interlock signals the rotor to move to flat pitch until the condition lever is advanced above Ground Idle. The Start switch 52 for the engine is then closed. This energizes the starter through mechanism immaterial here. The engine goes through a starting cycle during which it is accelerated by the starter, the ignition is turned on and fuel is introduced, the engine then continuing to pick up speed until at some point the starter is cut out and the engine is in normal operation. As shown in FIG. 2, with the condition lever at Ground Idle, the gas generator will accelerate to a speed of about 8800 rpm. With the gas generator operating at this low speed, the torque delivered by the power turbine is relatively slight. Normally, after all of the engines are started, the condition levers are moved partially or all the way to the "Fly" position to call for a higher gas generator governor setting. This causes the gas generators to accelerate to the speed called for by the condition levers up to a maximum, in this case, of approximately 12,000 rpm. This greatly increases the power output of the power turbines.

In the particular aircraft, it is possible to overload the gearboxes if all three engines are putting out maximum torque at the same time under normal atmospheric conditions. Otherwise, the gearing would be unduly heavy. Under extremely hot conditions, the torque output is lower. On the other hand, in extremely cold weather, the torque available is greater. However, since the gas generator governors may not be moved to call for more than 12,000 gas generator rmp, the power available is limited to a reasonable value except in extreme conditions of cold weather, in which case the controls may not be moved all the way to the Fly position.

Also, the rotor may be damaged by excessive torque, particularly at low speed where the buckling effect of the torque transmitted from the rotor hub to the rotor blades is not sufficiently opposed by centrifugal force on the blades.

In this control system, the gas generator speed setting is held to the 80% value until the power turbines and rotor come up to 85% rated speed, and thereafter the system prevents a heavy surge of power when the power turbine governor is cut in, as explained more fully in Ser. No. 489,263 filed July 17, 1974, of common ownership.

Assuming that the power turbine governor is set to call for 100% speed, it is held inoperative by the circuits described until 85% speed is reached at point 406. At this point the power turbine generator setting is advanced by the governor trim signal from 85 to 100% at a rate of approximately 3% per second. This gradual increase in governor setting prevents a too heavy surge of torque into the gearboxes and rotors. The torque increases, with the power turbine governor calling for more power by biasing the gas generator governor. Torque reaches a maximum value at the point 407 and then decreases as the rotor reaches the desired 100% speed. After a minor overspeed transient, the rotor system stabilizes at the point 408 which represents steady-state rotor speed and torque with the control set to Fly at minimum collective pitch. At this point the rotor system is in full speed operation, and if it is desired to lift the aircraft, the collective pitch is increased. With the increase in collective pitch, the gas generator governor setting is increased as indicated by the curve 126 in FIG. 2 to a maximum of about 14,400 at maximum collective pitch setting. The charge in governor setting responsive to the collective pitch will generally parallel the increasing load as pitch is increased. If further trimming is required, it is accomplished by the governor trim system of the power management control. Normally, the trim effect is to reduce power.

The normal 100% rotor speed is maintained unless there is some fault in the power plant or the pilot operates the beeper system to reset the isochronous governing system as previously described. This may be operated to vary rotor speed between 90 and 104% of normal rated speed.

The load sharing function of the control is normally in operation as described above to increase the fuel to any power plant which is delivering less torque than that delivered by the power plant delivering the greatest torque. Assuming that one power plant is capable of delivering a certain torque at a particular gas generator speed, whereas the others will require somewhat higher gas generator speed to provide the same torque, the governors of these others are trimmed to increase gas generator speed and equalize the torques. Such equalization does not normally change the rotor speed, since the rotor isochronous governor acts to reduce the torque of all the power plants concurrently to maintain the preset rotor speed.

The design of the aircraft and three engine power plant installation is such that under all normal conditions it is possible to maintain flight under full load with only two engines. If one of the three engines fails completely, the reduced torque output will result in a loss of rotor speed. The power turbine governor will detect the speed drop and act to increase the power trim signal to all power units. This does nothing for the failed unit, but it causes a rapid power increase from the two operating engines. With this increase in power, the rotor load accelerates back to substantially rated speed. Thus, after an engine power loss, the remaining engines automatically assume the load and maintain governed speed unless these engines encounter some operating constraint.

In the event of partial failure of an engine, causing it to fail to deliver its full share of power, the load sharing control will increase the governor setting of the crippled engine up to the limit of its authority or to where this increase is limited by the power turbine inlet temperature limit or by maximum gas generator speed (the latter being limited by the fuel control). However, the output of the properly operating engines is increased to take up the difference.

If a failure in the control should cause one power unit to go to maximum power, the power delivered by the other units is accordingly reduced by the rotor isochronous governor and the circuits described above. This condition may then be corrected by the pilot by movement of his condition lever to reduce the power setting of the engine which is accepting too much of the load.

If desired, the load sharing system may be turned off, in which case relative outputs of the engines may be adjusted by the condition levers or the governor settings may be adjusted by the auxiliary beepers. When the load share is turned off, the isochronous governor continues to contribute to the governor trim of the engine.

If the isochronous governor fails or does not operate properly, it may be cut out, in which case the rotor may be governed by the power unit governors as varied by the master beeper system or by the auxiliary beeper system to change the setting of the gas generator governors. The power plant may be operated with both load sharing and isochronous governing cut off.

The engine electronic control may be turned off at the switch 50 for any engine. In this case, the governor trim system is totally disabled. The gas generator governor still responds to condition lever position and collective pitch as described above.

CONCLUSION

It should be clear to those skilled in the art that the power management system described above is particularly adapted to respond authoritatively to failure or partial failure of an engine or to faults of one sort or another in the control system. It maintains rotor speed essentially constant notwithstanding loss of one power unit. It provides stand-by modes of control if any part of the power management or engine electronic control system is disabled. It balances output between the power units by bringing the other power units up to the level of the strongest. If this results in speed of the rotor greater than called for, the system as a whole is trimmed down, with the torques remaining balanced. Overloading of the rotor system during rotor acceleration is prevented. The system described acts to keep rotor speed variations within 3% notwithstanding full scale snap changes in collective pitch. The collective pitch input to the engine control minimizes the required electronic trim authority and improves control operation with the electronics off.

As will be apparent from FIGS. 2, 5, and 6 and the foregoing description, a failure of the condition lever or collective pitch signal to reach the fuel control servos will increase engine power output.

Specific numerical values in the specification are those which are considered most suitable for the particular installation described here and most, if not all, of these values are open to change where desired.

The system has been described in connection with a three-engine installation, but can obviously be modified for use with two, four, or more engines.

Also, it is applicable to power plants employing single-shaft gas turbine engines with some attendant simplification due to the single turbine in each engine. In the helicopter example cited, a disengageable clutch between each power unit and the rotor system would be needed if single-shaft turbines were substituted for the free turbine type.

The detailed description of the preferred embodiment of the invention for the purpose of explaining the principles thereof is not to be considered as limiting or restricting the invention, since many modifications may be made by the exercise of skill in the art.

We claim:

1. An engine control system for a helicopter having plural engines geared to a common lifting rotor system with collective pitch control, the engine control system comprising, in combination, means including a condition control for setting the power level of each engine; a power control for supplying fuel to each engine including engine power level setting means; said power control further including a condition servomotor and a collective pitch servomotor additively coupled to said engine power level setting means in the power control; means coupled to the condition control for transmitting a power level request electrical control signal decreasing with increasing power level request from the condition control to the condition servomotor; and means coupled to the collective pitch control for transmitting an electrical control signal decreasing with increasing collective pitch request from the collective pitch control to the collective pitch servomotor; the servomotors operating in such sense that said engine power level setting means increases fuel supply in response to decreasing power level request signals calling for increased power and also increases fuel supply in response to decreasing collective pitch signals indicative of increased collective pitch, with the result that a failure of transmission of either signal simulates a maximum power request with relation to that signal.

2. An engine control system for a helicopter having plural gas-coupled turbine engines geared to a common lifting rotor system with collective pitch control, the engine control system comprising, in combination, means including a condition control for setting the power level of each engine; a fuel control for each engine including a condition servomotor and a collective pitch servomotor; means for additively coupling said condition servomotor and said collective pitch servomotors to produce a fuel supply level to each engine; means coupled to the condition control for transmitting a power level request electrical control signal decreasing with increasing power level request from the condition control to the condition servomotor; and means coupled to the collective pitch control for transmitting an electrical control signal decreasing with increasing collective pitch request from the collective pitch control to the collective pitch servomotor; the servomotors operating in such sense that fuel supply is increased in response to decreasing power level request signals calling for increased power and fuel supply is also increased in response to decreasing collective pitch signals indicative of increased collective pitch, with the result that a failure of transmission of either signal simulates a maximum power request with relation to that signal.

3. An engine control system for a helicopter having plural gas-coupled gas turbine engines geared to a common lifting rotor system with collective pitch control, the engine control system comprising, in combination, means including a condition control for setting the power level of each engine; a fuel control for each engine including a condition servomotor and a collective pitch servomotor; means for additively coupling said condition servomotor and said collective pitch servomotors to produce a fuel supply level to each engine; means coupled to the condition control for transmitting a power level request electrical control signal decreasing with increasing power level request from the condition control to the condition servomotor; means coupled to the collective pitch control for transmitting an electrical control signal decreasing with increasing collective pitch request from the collective pitch control to the collective pitch servomotor; the servomotors operating in such sense that fuel supply is increased in response to decreasing power level request signals calling for increased power and fuel supply is also increased in response to decreasing collective pitch signals indicative of increased collective pitch, with the result that a failure of transmission of either signal simulates a maximum power request with relation to that signal; means responsive to speed of the rotor effective to vary the engine power level settings of all the engines; and means responsive to power output of several engines effective to adjust the power level settings to equalize the power outputs in normal operation.

* * * * *